United States Patent
Melo et al.

(10) Patent No.: US 6,243,817 B1
(45) Date of Patent: Jun. 5, 2001

(54) DEVICE AND METHOD FOR DYNAMICALLY REDUCING POWER CONSUMPTION WITHIN INPUT BUFFERS OF A BUS INTERFACE UNIT

(75) Inventors: Maria L. Melo; James R. Reif, both of Houston; David J. Maguire, Spring, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/995,703

(22) Filed: Dec. 22, 1997

(51) Int. Cl.[7] .................................. G06F 1/26; G06F 1/28; G06F 1/30; G06F 11/30
(52) U.S. Cl. ................... 713/300; 713/323; 713/324; 713/340; 345/520; 361/86
(58) Field of Search ........................... 713/300, 323, 713/324, 340; 361/86; 73/53.001; 345/520

(56) References Cited

U.S. PATENT DOCUMENTS

| | | | |
|---|---|---|---|
| 5,420,808 | * | 5/1995 | Alexander et al. ............... 364/707 |
| 5,535,400 | * | 7/1996 | Belmont ............................. 713/300 |
| 5,603,037 | * | 2/1997 | Aybay ................................ 713/300 |
| 5,721,935 | * | 2/1998 | DeSchepper et al. ............. 713/300 |
| 5,727,171 | * | 3/1998 | Iachetta, Jr. ....................... 710/107 |
| 5,835,435 | * | 11/1998 | Bogin et al. ....................... 365/227 |
| 5,842,029 | * | 11/1998 | Conary et al. ..................... 713/322 |
| 5,886,252 | * | 3/1999 | Lenert et al. ................... 73/53.001 |
| 5,910,876 | * | 6/1999 | Sharma et al. ...................... 361/86 |
| 5,926,629 | * | 7/1999 | Gulick .............................. 710/117 |
| 5,935,226 | * | 8/1999 | Klein ................................. 710/101 |
| 5,949,284 | * | 9/1999 | Frisch ................................ 330/253 |
| 5,983,325 | * | 11/1999 | Lewchuk .......................... 711/137 |
| 6,029,006 | * | 2/2000 | Alexander et al. ................ 713/323 |
| 6,040,845 | * | 3/2000 | Melo et al. ........................ 345/520 |
| 6,065,124 | * | 5/2000 | Lee ................................... 713/323 |

\* cited by examiner

*Primary Examiner*—Ayaz Sheikh
*Assistant Examiner*—Frantz B. Jean
(74) *Attorney, Agent, or Firm*—Karen L. Daffer; Conley, Rose & Tayon P.C.

(57) ABSTRACT

A computer is provided having a bus interface unit coupled between a CPU bus and a mezzanine bus, or PCI bus. The bus interface unit includes a plurality of input buffers which can be selectively connected and disconnected in a dynamic fashion according to active and inactive signals forwarded thereto. Signals forwarded to the bus interface unit from the CPU are classified according to the transaction phase of CPU bus activity. If signals associated with one particular transaction phase are active, then input buffers attributed to signals of other transaction phases can be deactivated. It is preferred that input buffers associated with signals of a request and arbitration phase be maintained active and coupled to power regardless of the present transaction phase unless the computer enters a powered down mode, such as sleep, idle or standby.

15 Claims, 6 Drawing Sheets

DEVICE AND METHOD FOR DYNAMICALLY REDUCING POWER CONSUMPTION WITHIN INPUT BUFFERS OF A BUS INTERFACE UNIT

BACKGROUND OF THE INVENTION

1. Field of the Invention

This invention relates to a computer and, more particularly, to a bus interface unit having a plurality of input buffers which can be selectively deactivated depending on the current power state of the computer and/or activity upon a central processing unit ("CPU") local bus.

2. Description of the Related Art

Power consumption in an electronic device is always a significant concern. Longevity of the power supply, heat dissipation, physical size, weight, efficiency and other related characteristics are paramount in designing the electronic device. These characteristics become exceptionally critical when the device is a self-sufficient portable unit.

A portable unit is one in which power is supplied from a battery during times when the unit is decoupled from its main power source, e.g., a 110 volt ac supply. In some instances, the battery functions as an auxiliary power source to ensure critical circuits are kept alive and to retain information stored in memory. In other instances, the battery functions as the main power source to fully power the device in its operational state.

Various types of portable units can be powered from a battery including, for example, a computer. Modern portable computers are called upon to perform at increasingly higher levels. For example, a high performance portable computer may employ a high speed CPU and multiple buses between the CPU and numerous input/output devices. Multiple buses may include a CPU local bus connected directly to the CPU, a peripheral bus connected to slower input/output devices, and a mezzanine bus connected between the CPU local bus and the peripheral bus. The peripheral bus can be classified as, for example, an industry standard architecture ("ISA") bus, an enhanced ISA ("EISA") bus or a microchannel bus. The mezzanine bus can be classified as, for example, a peripheral component interface ("PCI") bus to which higher speed input/output devices can be connected.

Coupled between the various busses are bus interface units. According to somewhat known terminology, the bus interface unit coupled between the CPU bus and the PCI bus is often termed the "north bridge". Similarly, the bus interface unit between the PCI bus and the peripheral bus is often termed the "south bridge".

The north bridge bus interface unit must accommodate the high speed clocking cycles of the CPU. In many instances, the internal clock of a modern day CPU will transition at rates exceeding several hundred MHz. In order to accommodate this speed, signal swing within the CPU bus must be somewhat limited. For example, complimentary metal oxide semiconductor ("CMOS") signal swings are too large even though CMOS technology consumes minimal power.

Recently, another standard for electrical signal transmission called Gunning Transceiver Logic ("GTL") has been devised which can accommodate the higher speeds of modern CPU buses. Typically, a GTL signal will extend minimally above and below a reference voltage. In order to illustrate GTL usage in a modern Pentium® Pro CPU bus operating in excess of 50 MHz, GTL signal swings are typically constrained less than 200 millivolts from a reference voltage.

Smaller voltage swings may allow higher clock speeds. However, a GTL bus is an "open-collector" bus which generally requires pull-up resistors near terminating ends of each bus conductor. Significant power consumption is due, in part, to the operation of the pull-up resistors. In addition, GTL or GTL+ advocated by Intel Corporation requires a level-sensitive differential amplifier coupled to receive the GTL signals. Regardless of whether the signal is active or inactive, the differential amplifier nonetheless remains on and consumes power. Embodied upon the north bridge and associated with each conductor of the CPU bus is a constantly on differential amplifier.

It would be desirable to produce a portable computer which can accommodate a high speed CPU bus using, for example, differential signals set forth possibly in a GTL, GTL+, 1394 or serial link format. However, to produce a viable portable computer having the aforesaid performance characteristics, a mechanism must be derived which can monitor the CPU bus and periodically reduce power consumption in the critical elements of the portable computer. Namely, an improvement is needed for dynamically reducing power consumption of the differential amplifiers within the north bridge when the differential signals sent across the CPU bus are inactive. Reducing power consumption in a portable computer having a bus which employs differential signals would help extend the battery life of the computer.

SUMMARY OF THE INVENTION

The problems outlined above are in large part solved by an improved power management technique. Power management involves reducing power in the north bridge by disconnecting power to differential input amplifiers when they are not receiving active signals. A mechanism is used to monitor the CPU bus and signals within that bus. If signals appear, they generally appear in relation to a particular bus activity. That is, all transactions of a CPU bus are related to a single bus request, beginning with bus arbitration, and the assertion of an address strobe, ADS#. Transactions are driven to transfer data, to inquire about or change cache state, or to provide the system with information. Thus, a transaction may contain numerous phases, wherein a phase uses a specific set of signals to communicate a particular type of information. For example, the Pentiumt® Pro CPU bus protocol involves up to six phases: arbitration, request, error, snoop, response, and data transfer.

By monitoring signals associated with specific transactional phases, it is determined that many of the input buffers within the north bridge can be periodically turned off (i.e., disconnected from power or ground). For example, when signals attributed to a snoop phase are active, then signals associated with all other phases will be inactive, if the phase attributed to those signals do not overlap with the snoop phase. This allows an opportunity to disconnect power to all input buffers within the north bridge except those receiving active signals, or except those which are needed to receive the initial address strobe, ADS#. Accordingly, when signals associated with a particular phase are active, only the differential amplifiers which receive those signals are powered, along with differential amplifiers configured to receive the original request phase signals should they occur.

The present mechanism can also monitor the power state of the computer to determine if the computer is in a run state or a sleep state. If in a sleep state (including, e.g., idle state, standby state and hibernation state), then the CPU bus is monitored for a stop clock signal (STPCLK_) which indicates entry into the sleep state. If the stop clock signal is encountered, then all input buffers and/or differential amplifiers coupled to receive input signals from the CPU bus are disconnected from power. As defined herein below, power is the upper or lower power supplies, including $V_{DD}$, $V_{CC}$ and/or ground.

Broadly speaking, the present invention contemplates a computer. The computer comprises a CPU and a bus coupled to the CPU. The bus comprises a plurality of conductors segregated into sets of conductors. Each set of conductors accommodates a plurality of signals which are active only during a discrete transaction phase of the bus. The computer further comprises a bus interface unit coupled to the CPU bus. The bus interface unit comprises a plurality of input buffers segregated into sets of input buffers coupled to respective sets of conductors. The sets of input buffers are selectively disconnected from power during times in which the plurality of signals forwarded thereto are inactive.

According to one embodiment, the transferred signals are classified according to a transaction phase of activity upon the CPU bus. A set of input buffers can be selectively disconnected from power by forwarding a disable signal to a transistor coupled between a power supply and the input buffers required to be powered down. The selectively disconnected input buffers are attributed to signals of a transaction phase which are currently inactive. Signals within a transaction phase that are active have, associated therewith, power-connected input buffers. By selectively disconnecting power from input buffers and specifically differential amplifiers associated with those buffers, current through and power consumed by input buffers which receive inactive signals is eliminated.

The present invention further contemplates a computer comprising a CPU, a bus interface unit, and a bus interposed therebetween. The bus interface unit comprises a first set and a second set of input buffers coupled to receive a respective first and second sets of signals forwarded across dissimilar conductors within the bus extending from the CPU. A mechanism is provided for monitoring activity upon the bus, for selectively applying power to the first set of input buffers if the first set of signals are active, and for selectively removing power to the second set of input buffers if the second set of signals are inactive. The input buffers comprise differential amplifiers which consume power unless power is selectively removed therefrom. The bus interface unit further comprises a third set of input buffers coupled to receive a respective third set of signals. Power is retained upon the third set of input buffers regardless of whether the first, second or third set of signals are active. Accordingly, the third set of signals are active throughout all transactional phases and during a third transactional phase dissimilar from the first and second transactional phases associated with the first and second sets of signals, respectively. The third transactional phase comprises an initial phase of activity for a transaction related to a request phase of the CPU bus.

The present invention yet further contemplates a method for minimizing power consumption within the bus interface unit. The method comprises monitoring transactional phases of activity within a bus coupled between a CPU and the bus interface unit. Sets of input buffers within the bus interface unit are selectively disconnected if signals forwarded to the input buffers attributed to a particular transactional phase are inactive. Sets of input buffers within the bus interface unit are selectively connected if signals forwarded to the input buffers attributed to a particular transactional phase are active. Each of the sets of input buffers can be disconnected within the bus interface unit if a clock internal to the CPU is disabled (i.e., if the CPU undergoes a power down state or "sleep state").

BRIEF DESCRIPTION OF THE DRAWINGS

Other objects and advantages of the invention will become apparent upon reading the following detailed description and upon reference to the accompanying drawings in which.

Figure 1:
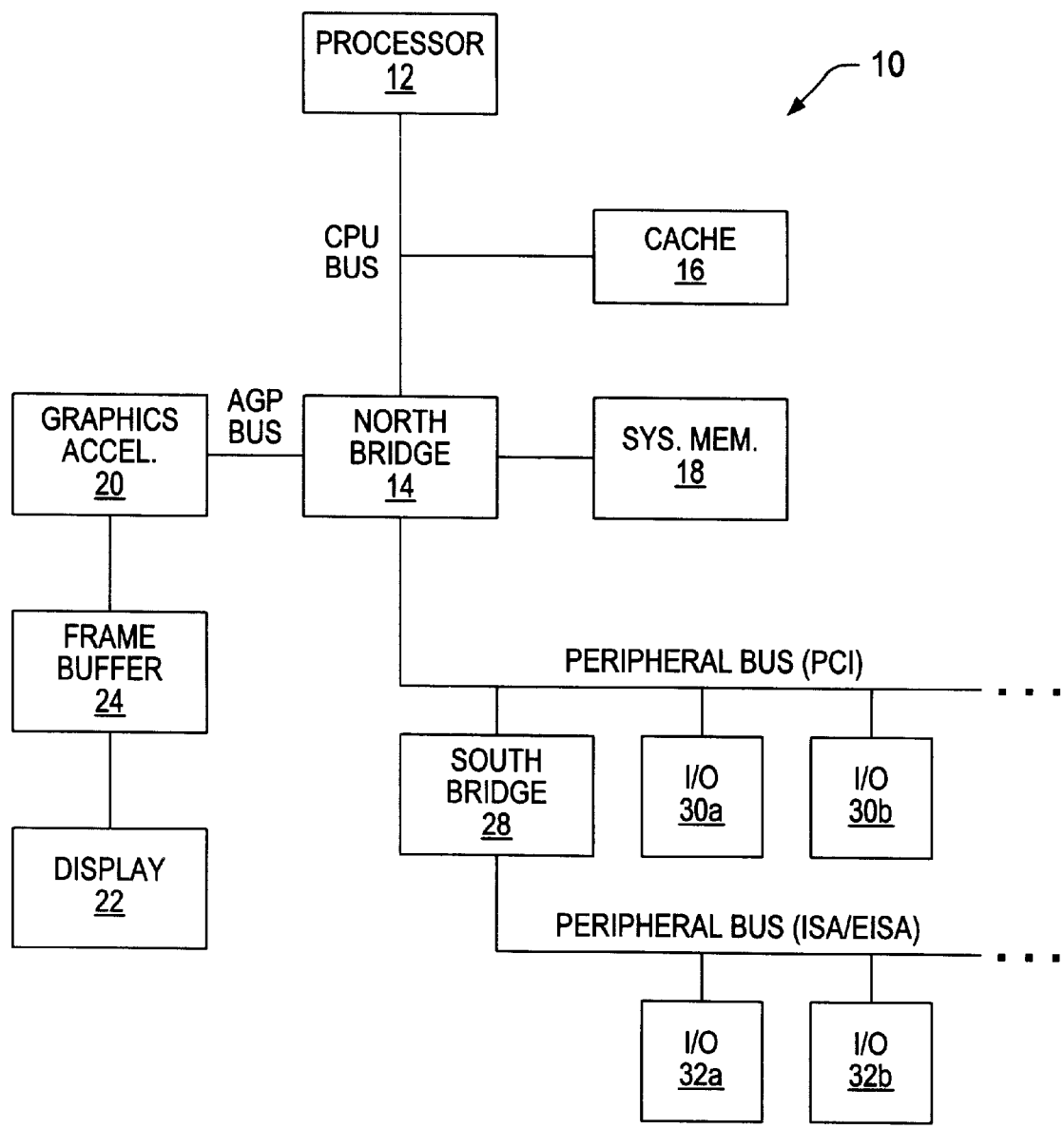
FIG. 1 is a block diagram of a computer system comprising north and south bus bridges.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning to the drawings, FIG. 1 illustrates a computer 10 having multiple buses, including a CPU bus, a mezzanine or PCI bus, and a peripheral bus or ISA/EISA bus. The CPU bus connects a CPU or processor 12 to a bus interface unit or north bridge 14. A cache memory 16 can be embodied within or external to CPU 12.

North bridge 14 provides an interface between components clocked at dissimilar rates. According to one embodiment, north bridge 14 interfaces a slower PCI bus and a faster CPU bus. North bridge 14 may also contain a memory controller which allows communication to and from system memory 18. A suitable system memory 18 comprises DRAM or SDRAM. North bridge 14 may also include a graphics port to allow connection to a graphics accelerator 20. A graphics port, such as the Accelerated Graphics Port ("AGP") provides a high performance, component level interconnect targeted at three dimensional graphic display applications and is based on performance extensions or enhancements to PCI. AGP interfaces are generally standard in the industry, the description of which is available from Intel Corporation.

Generally speaking, AGP is physically, logically, and electrically independent of the PCI bus and intended for the exclusive use of a display device 22 coupled to the graphics port (or AGP) by a graphics accelerator 20 and local memory or frame buffer 24. The form and function of a typical graphics accelerator is generally known in the art to render three dimensional data structures which can be effectively shifted into and from system memory 18 to alleviate increased costs of local graphics memory. Frame buffer 24 is generally understood as any buffer which can capture a frame of memory, defined as a still picture. Display 22 is any electronic display upon which an image or text can be presented. A suitable display 22 includes a cathode ray tube ("CRT"), a liquid crystal display ("LCD"), etc.

North bridge 14 is generally considered an application specific chip set, or application specific integrated circuit ("ASIC") that provides connectivity to various buses, and integrates other system functions such as memory interface and P1394. System memory 18 is considered the main memory and refers to a portion of addressable memory that the majority of memory access target. System memory 18 is accessed via north bridge 14, and is considered the largest continuous memory space of computer 10.

Unlike the CPU bus which runs at speeds comparable to CPU 12, PCI bus generally runs at speeds of, e.g., 33 MHz or lower. A south bridge 28 is coupled between the PCI bus and the peripheral bus. Similar to north bridge 14, south bridge 28 is an ASIC or group of ASICs that provide connectivity between various buses, and may also include system functions which can possibly integrate one or more serial ports. Attributable to the PCI bus are input/output ("I/O") devices 30 which require higher speed operation than I/O devices 32.

Figure 2:
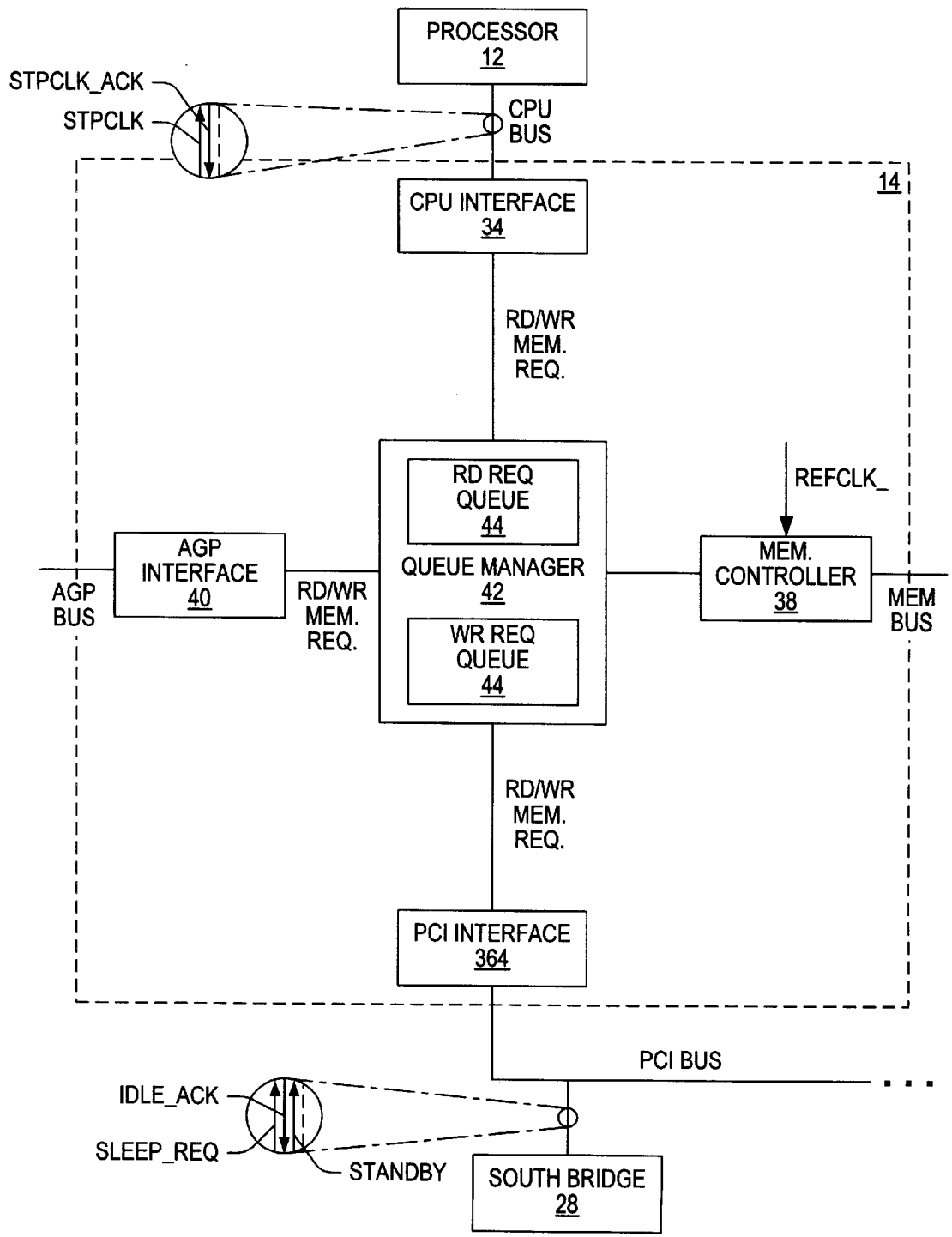
FIG. 2 is a block diagram of the north bus bridge and coupling thereto.

Turning to FIG. 2, details regarding north bridge 14 are shown. The various subcomponents of north bridge 14 can be connected upon a monolithic substrate for high end portable computers. North bridge 14 operates in conjunction with south bridge and includes five functional blocks: CPU interface 34, PCI interface 36, memory controller 38, AGP interface 40, and queue manager 42. Interfaces 34, 36 and 40 each contain transient buffers where address and data information (write cycles only) for memory cycles are stored. These interfaces communicate with memory controller 38 via queue manager 42.

Queue manager 42 arbitrates from among various read and write memory requests emanating from interfaces 34, 36 and 40. Queue manager 42 further includes a read request queue 44 and a write request queue 46. Queue manager 42 receives read/write requests from the various interfaces, arbitrates between them, and loads the request into either the read request queue or the write request queue 44 and 46, respectively. Queue manager 42 does not necessarily give a higher priority to any one interface, allowing isochronous devices to be added without substantial changes in the overall design. All write cycles are snooped before the are loaded into write request queue 46. Read cycles snoop the write request queue on only select address bits. A comparison of, e.g., the upper order bits determines if a hit or miss applies. If cross snooping detects a miss, the read within queue continues to memory controller without any intervening action. However, if a hit occurs, write cycles within queue 46 are flushed before a read cycle occur. The so-called read around write is performed within memory controller 38. Write cycles can also snoop queue 44 so that writes are not flushed (which come later in sequence) ahead of reads when write queue 46 is flushed. Memory controller 38 assigns a higher priority to a read cycle than a write cycle, thereby implementing the read around write feature.

FIG. 2 further indicates a plurality of conductors within the CPU bus, two of which are assigned to transfer a stop clock (STPCLK) and a stop clock acknowledge (STPCLK_ACK). Also illustrated are various conductors designed to transfer a sleep request signal (SLEEP_REQ), and idle acknowledge signal (IDLE_ACK) and a standby signal (STANDBY) arising from a power management controller embodied within south bridge 28.

Figure 3:
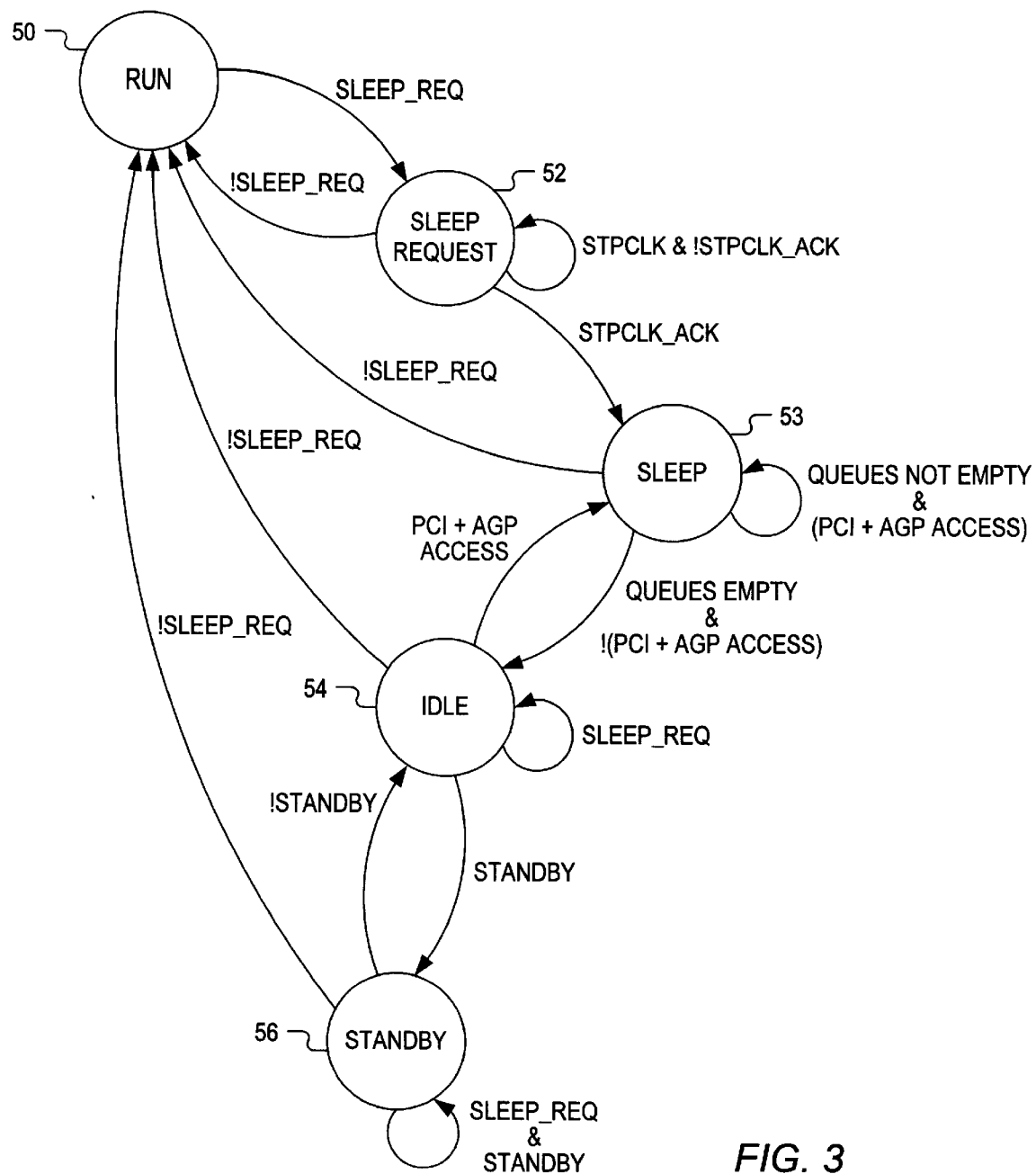
FIG. 3 is a state diagram of various power states of the computer system.

Referring to FIGS. 2 and 3 in combination, the present computer comprises a power management device which can turn off various clocks of the computer subcomponents in order to save power. Thus, the present computer can operate in various power management states comprising run, sleep request, sleep, idle and standby. An additional power management state, known as hibernation, may also be included. However, as a minimum, power management includes a run state and a sleep state. If a sleep request signal is dispatched from the south bridge 28, north bridge 14 responds by dispatching a stop clock signal to CPU 12, as shown in sleep request state 52. Eventually, CPU 12 will respond by returning a stop clock acknowledge signal back to north bridge 14, causing a transition to the sleep state 53. Absent a stop clock acknowledge signal (i.e., during !STPCLK_ACK), sleep request state 52 is retained.

Sleep state 53 disables the internal clock of the CPU but maintains the internal clocks of the PCI and AGP interfaces 36 and 40, respectively. Sleep state also maintains the internal clock to all other interfaces within north bridge 14. During sleep state 53, the PCI and AGP interfaces remain active to allow accesses thereto. North bridge 14 remains in sleep state 53 until the sleep request signal is deasserted (i.e., during !SLEEP_REQ). PCI or AGP cycles can still occur in sleep state 53, and will be snooped by CPU 12. While otherwise, if all the internal queues 44 and 46 within queue manager 42 become empty, and no access is emanating from the PCI or AGP buses, then north bridge 14 will transition to an idle state 54.

In the idle state, both CPU 12 and north bridge 14 have their internal clocks disabled. An idle acknowledge signal is sent to south bridge 28 to indicate entry into idle state 54 from sleep state 53.

Transition from idle state 54 to standby state 56 occurs by assertion of a standby signal from south bridge 28 while north bridge 14 and CPU 12 internal clocks are off. The internal phase lock loop ("PLL") of north bridge 14 is turned off.

Regardless of whether the current state is a sleep request state 52, a sleep state 53, an idle state 54 or a standby state 56, deassertion of SLEEP_REQ (or !SLEEP_REQ) triggers return to run state 50 and activation of the various internal clocks.

FIGS. 2 and 3 illustrate power management states which produce power saving responses upon input buffers of north bridge 14 based on those states. As will be described herein below, all power management states except for run state 50 cause a disable signal upon differential amplifiers of each and every input buffer coupled to receive conductors of the CPU bus. Thus, if the computer is in a state other than run 50, the input buffers within north bridge 12 coupled to receive signals from CPU 12 are disconnected from the power supply in response to the sleep request signal and after a STPCLK_ACK cycle (i.e., CPU acknowledging by running a STOP_GRANT cycle). Accordingly, the current power management states determines connect/disconnect of the input buffers, similar to transactional phases upon those input buffers.

Figure 4:
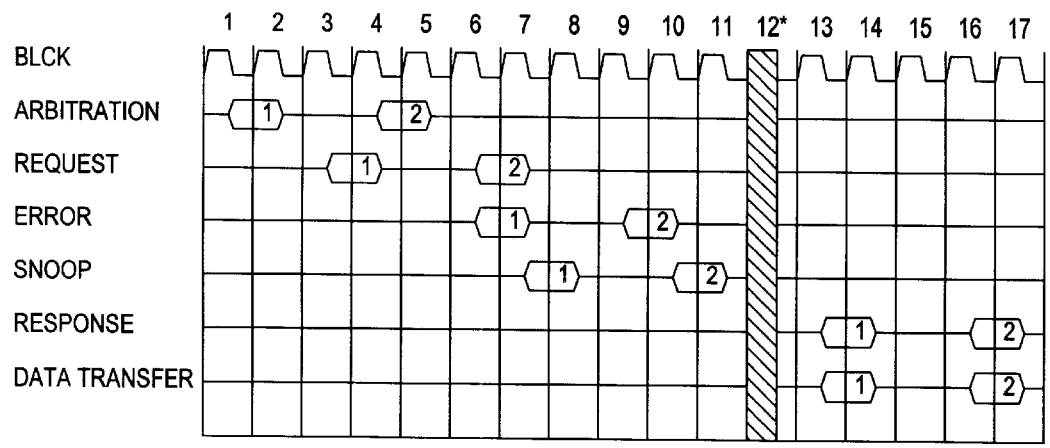
FIG. 4 is a timing diagram of two exemplary transactions and data transfers of various transaction phases across a CPU local bus.

Turning now to FIG. 4, transaction phases of an exemplary Pentium® Pro processor bus, suitable for use as the CPU bus, is shown. In particular, two transactions with data transfers are indicated pipelined through the various phases, beginning with arbitration phase, and ending with data transfer phase. Accordingly, each transaction related to a single bus request is broken into up to six phases. Not all transactions may contain all phases, and some phases can be overlapped.

Attributed to each phase are one or more signals forwarded across the CPU bus from the CPU. Thus, the north bridge receives signals based on which phase of activity the CPU bus cycle is currently undertaking. For example, arbitration phase signals include a bus request and a lock signal (BREQ#, BPRI# or LOCK#). Request phase signals include address strobe, request command and address signals (ADS#, REQ# and A#). Error phase signals include an address parity error (AERR#) while snoop phase signals include a hit, a hit to modified cache line signal (HIT# and HITM#), and a defer or retry signal (DEFER#). Response phase signals include response status signals, response parity and target ready signals (RS#, RSP# and TRDY#). Yet further, data phase signals include data ready, data bus ready and data signals (DRDY#, DBSY# and D#). Error phase signals are generally associated with bus initialization and bus error signals (BINT#, BERR#) etc. The various signals attributed to each transaction phase of a Pentiume® Pro CPU bus are well documented and available from Intel Corporation.

Figure 5:
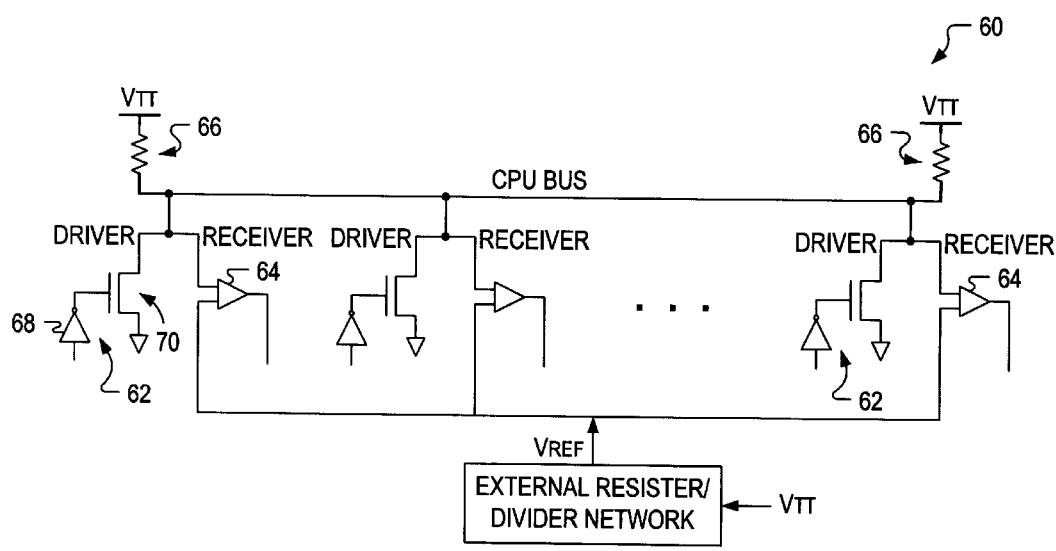
FIG. 5 is a circuit schematic of a transceiver used to transfer and receive signals sent across the CPU local bus.

FIG. 5 illustrates one of several transceivers for transferring differential signals across each conductor of the CPU bus. Transceiver 60 includes a driver 62 and a receiver 64 located at each end of each conductor of the CPU bus. External pull-resistors 66 are also provided, which are coupled between the conductors and a termination voltage ($V_{TT}$).

Driver 62 may include an inverter 68 and an open-drain transistor 70. When an active low signal is driven onto a conductor of the CPU bus, inverter 68 produces a logic high value which turns on an n-channel transistor 70, thereby producing an active low signal upon the CPU bus conductor. In instances where an active low signal is not driven, pull-up transistors will transition the conductor voltage towards $V_{TT}$. The voltage differential upon the bus conductors will therefore transition from an active low to an inactive high value centered about a reference voltage $V_{REF}$. The signal is therefore deemed a differential signal in that it differentiates about $V_{REF}$. The amount of differential change is relatively small to allow high speed transitions.

In order to discern the differential voltages upon the CPU, receivers 64 are embodied at terminal ends of the CPU bus (i.e., within the CPU and the north bridge). A more detailed illustration of receiver 64 within north bridge 14 is shown in reference to FIG. 6.

Figure 6:
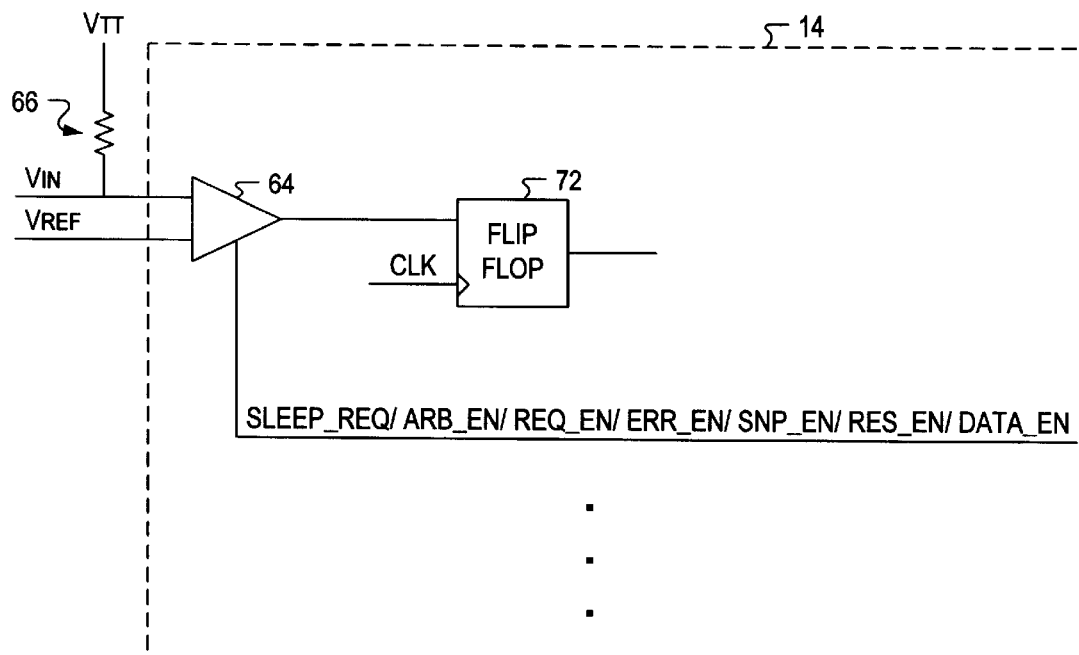
FIG. 6 is a circuit schematic of an input buffer within a receive portion of a transceiver.

FIG. 6 illustrates one of numerous receivers 64 associated with each conductor of the CPU bus. The conductor transfers a differential input voltage $V_{IN}$ to each input buffer, or receiver, attributed to each input pin of north bridge 14 to which the CPU bus is connected. Thus, FIG. 6 illustrates differential input signal $V_{IN}$ connected, along with reference voltage $V_{REF}$, to a differential amplifier embodied as receiver 64. The differential amplifier 64 is somewhat used interchangeably as a receiver to indicate an input pin of north bridge 14 coupled to the CPU bus. According to one embodiment, reference voltage $V_{REF}$ may be approximately two thirds of termination voltage $V_{TT}$. The value of pull-up resistors 66 may be adjusted to balance the hi-to-low and low-to-hi noise margins. Increasing the value of pull-up resistors 66 tends to the slow the rising edge, increasing rising flight time, and decreasing the low-to-hi noise margin while increasing hi-to-low noise margin by lowering $V_{OL}$. The differential voltage swing of $V_{IN}$ can vary such that the voltage input high $V_{IH}$ and the voltage input low $V_{IL}$ can vary approximately 200 millivolts from $V_{REF}$. If $V_{IN}$ exceeds $V_{REF}$ according to $V_{IH}$, then the amount of that difference will be amplified by differential amplifier 64 into flip-flop 72. A clocking input to flip-flop 72 is used to synchronize output from flip-flop 72 with, e.g., the PLLs within north bridge 14.

Figure 7:
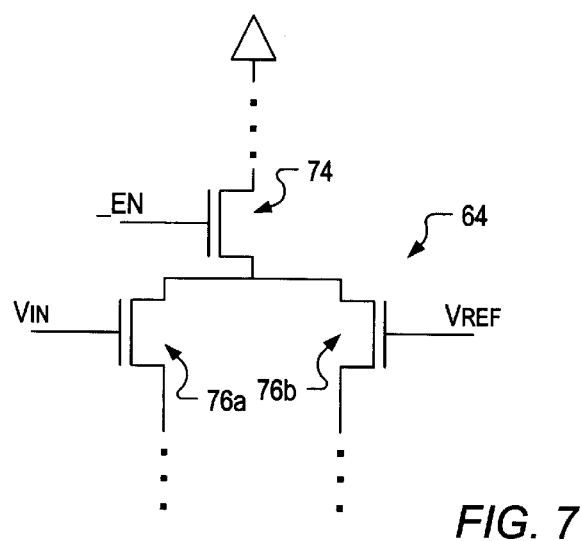
FIG. 7 is a partial circuit schematic of the input buffer of FIG. 6 depicting a mechanism for selectively deactivating the input buffer depending on the transaction phase and power state encountered.

Referring to FIGS. 6 and 7 in combination, differential amplifier 64 includes a connect/disconnect transistor 74. Transistor 74 includes a gate conductor upon which various input enable signals may be forwarded. Thus, each amplifier 64 associated with each CPU bus conductor includes a mechanism for disconnecting power from amplifier 64. Transistor 74 may, according to one embodiment, be placed between the differential transistor pairs 76 of amplifier 64, and a power supply. The power supply can comprise either the upper power supply (e.g., $V_{DD}$, $V_{CC}$) or ground. As will be described below, input enable signals (generally grouped and indicated as "_EN" signals) effectuates connection, while absence of enable signals effectuates disconnect. Amplifier 64 will be disconnected from the power supply if: (i) computer 10 is in an idle or standby state indicative of a sleep request signal being sent, along with acknowledge of stop clocks, accesses to the PCI or AGP interface being absent, and queues being empty, or (ii) an internal signal is asserted to disable an inactive differential amplifier if the signal connected to it is not needed for the current phase(s) on the bus. In the latter instance, receiver, or amplifier, attributed to certain "inactive" transaction phases will be disconnected from power, while only those receivers attributed to the currently active, one or more transaction phases are coupled to power. It is noted that receivers associated with conductors which carry bus arbitration and request phase signals will always remain connected to the power supply unless a sleep, idle or standby state is encountered. Thus, the CPU bus inputs can be disabled when there are no outstanding cycles pending from the CPU bus. Removing power to the differential transistor pairs 76 ensures that both transistor pairs are off. This is contrary to a differential transistor pair normal operation in which one transistor is always on, regardless of the input voltage $V_{IN}$ value.

Figure 8:
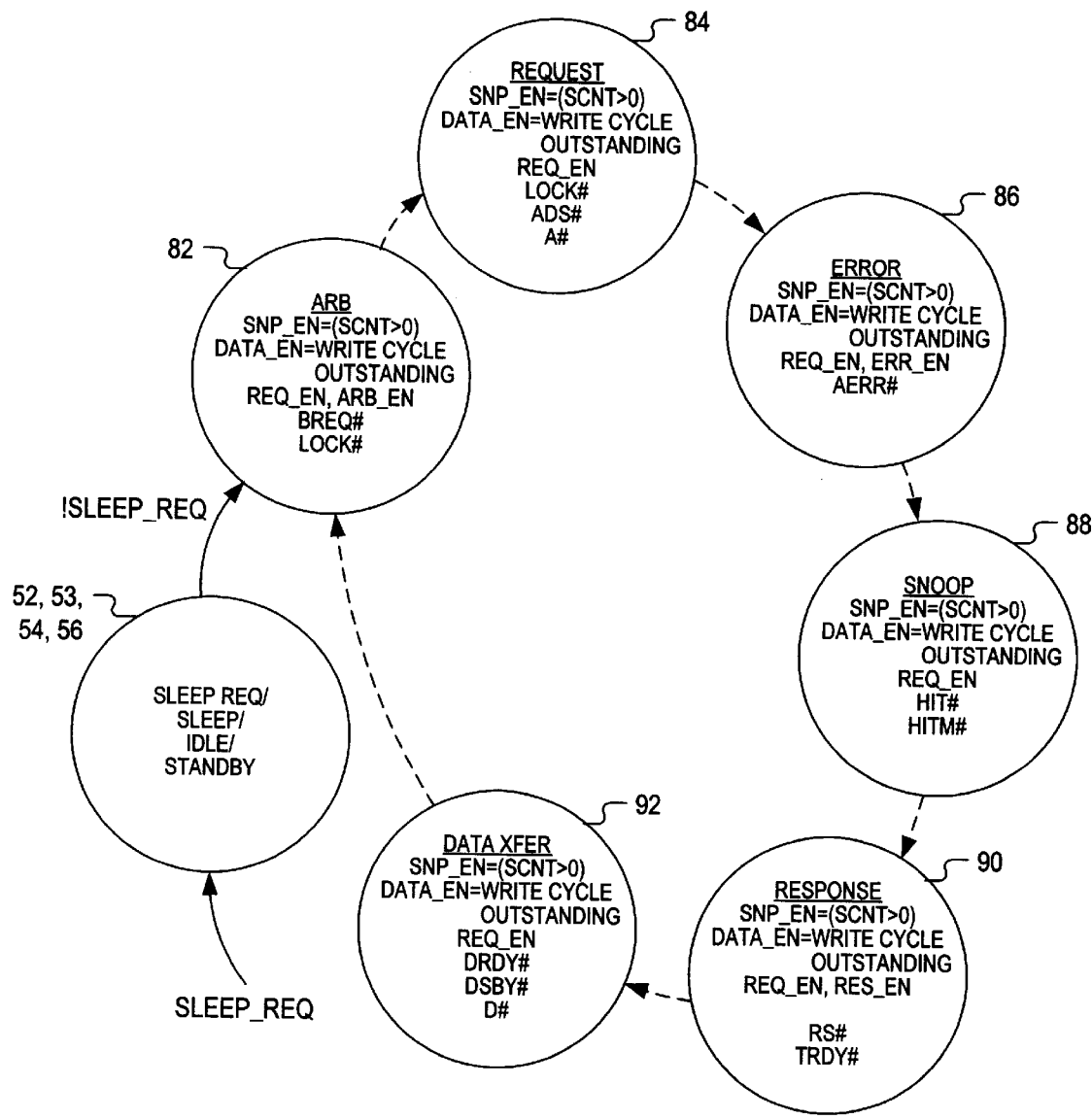
FIG. 8 is a diagram of various enable signals used to trigger transaction phases and power down states, and various disable signals used to deactivate select input buffers during those phases and states.

FIG. 8 illustrates various transaction phases of the CPU local bus, and a power management state of the computer. Transactional phases include arbitration phase 82, request phase 84, error phase 86, snoop phase 88, response phase 90 and data transfer phase 92. The phases can be followed in order, beginning with the arbitration phase and ending with the data transfer or response phase. Various phases can be skipped, and phases may overlap if cycles are pipelined on the CPU bus. Input enable signals associated with each phase which allows the north bridge to disable the CPU bus inputs are within those respective phases. For example, the arbitration phase includes signals BREQ# and LOCK# forwarded from the CPU across the CPU bus. Responsive to the certain conditions within each transaction phase, amplifiers associated with error signals, snoop signals, response signals, and data transfer signals, can be deactivated (disconnected from the power supply) during the arbitration phase. Power savings occurs in the various phases when the respective input enable signals are deasserted. Input enable signals are shown in FIG. 8 corresponding to each phase in which they are present. Input enable signals which are asserted (thus input buffers are enabled) during arbitration phase 82 include snoop enable (SNP_EN), provided the snoop count exceeds zero, data enable (DATA_EN) indicative of an outstanding write cycle, arbitration enable (ARB_EN) and the request enable (REQ_EN). Thus, amplifiers are active that are associated with the various signals enabled during each of the respective phases.

As shown in FIG. 8, regardless of the current transaction phase, amplifiers associated with request signals remain active in order for them to immediately receive and respond to a request phase. The only time in which the request phase signal cannot be recognized, and therefore amplifiers associated with the request phase signals are deactivated, is when the current power management state is in an idle or standby state (54 and 56) respectively. As noted in FIG. 8, certain conditions apply depending on which transactional phase arises. For example, the snoop phase signals are enabled when there is an outstanding snoop phase that must be completed (SCNT>0). The north bridge keeps track of the outstanding snoop phases on the CPU local bus by incrementing a snoop count (SCNT) with each assertion of ADS# detected on the CPU bus. The north bridge also tracks when the snoop phase for each CPU transaction completes, and decrements SCNT upon detecting each snoop phase completion. The data control signals (DRDY# and DBSY#) are enabled only during the data phase of a read or write transaction. The data bus signals (D#) are enabled only during the data phase of write transactions.

The north bridge comprises a mechanism for monitoring a CPU bus and for dynamically removing power and then reestablishing power to input buffers according to their classification attributed to transaction phase signals. North bridge 14 is therefore particularly suited to high end CPU bus systems employing differential inputs, such as GTL or GTL+. A high performance CPU bus can be accommodated but not with the power consumption penalties normally associated with differential amplifiers/receivers connected to that bus. Thus, the present computer enjoys high speed CPU bus transfers with minimal power consumption for idle conductors within that bus. Accordingly, the present computer is well suited for a portable computer where power management is utilized by not at the detriment of performance.

It will be appreciated to those skilled in the art having the benefit of this disclosure that this invention is believed to be capable of performing high speed CPU bus transfers with minimal power consumption, and/or dissipation. Various modifications and changes may be made as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A computer, comprising:
   an electronic display;
   a central processing unit (CPU) operably linked to the electronic display;
   a bus comprising a plurality of conductors coupled to the CPU, said plurality of conductors are segregated into sets of conductors, each set of which accommodates a plurality of signals which are active only during a discrete transaction phase of the bus; and
   a bus interface unit comprising a plurality of input buffers segregated into sets of input buffers coupled to respective said sets of conductors, wherein each of said plurality of input buffers comprises a differential amplifier having a pair of inputs, one of which is coupled to receive a reference voltage and the other of which is coupled to one of said plurality of conductors, and wherein said sets of input buffers are selectively disconnected from power during times in which said plurality of signals forwarded thereto are inactive.

2. The computer as recited in claim 1, wherein said transaction phase of activity is selected from the group comprising arbitration, request, error, snoop, response and data transfer.

3. The computer as recited in claim 1, wherein said sets of conductors accommodates dissimilar transferred signals classified according to said transaction phase of activity selected from the group comprising arbitration, request, error, snoop, response and data transfer.

4. The computer as recited in claim 1, further comprising a pull-up resistor and a drive transistor coupled to each of said plurality of conductors.

5. The computer as recited in claim 1, wherein said sets of input buffers are selectively disconnected from power by forwarding a disable signal to a transistor coupled between a power supply and the sets of input buffers.

6. The computer as recited in claim 1, wherein said plurality of signals forwarded to respective said sets of conductors are inactive if the computer is in a power down state comprising sleep, idle or standby modes of operation.

7. A computer, comprising:
   an electronic display;
   a central processing unit (CPU) operably linked to the electronic display;
   a bus;
   a bus interface unit comprising a first set and a second set of input buffers coupled to receive a respective first set of signals and a second set of signals forwarded across the bus from the CPU, wherein said input buffers comprise differential amplifiers which consume power unless power is selectively removed therefrom; and
   a mechanism for monitoring activity upon the bus, for selectively applying power to the first set of input buffers if the first set of signals are active, and for selectively removing power to the second set of input buffers if the second set of signals are inactive.

8. The computer as recited in claim 7, wherein said first set of signals are active during a first transaction phase of activity upon the bus, and wherein said second set of signals are active during a second transactional phase dissimilar in time from the first transactional phase.

9. The computer as recited in claim 8, wherein said first and second transactional phases may occur at different clock cycles of the bus.

10. The computer as recited in claim 8, wherein said mechanism comprises logic coupled to the bus for dispatching an enable signal to the second set of input buffers only if the second set of signals are active.

11. The computer as recited in claim 8, wherein said mechanism comprises logic coupled to the bus for dispatching a disable signal to both the first and second set of input buffers if the computer is in a powered down state.

12. The computer as recited in claim 7, further comprising a third set of signals and a respective third set of input buffers which retain power thereto regardless of whether the first, second or third set of signals are active.

13. The computer as recited in claim 12, wherein the third set of signals are active during a third transactional phase dissimilar in time from the first and second transactional phases.

14. The computer as recited in claim 13, wherein the third transactional phase comprises an initial phase of activity for a transaction related to a request for the bus.

15. The computer as recited in claim 13, wherein the third transactional phase comprises an arbitration phase of activity.

* * * * *